United States Patent Office 3,155,196
Patented Nov. 3, 1964

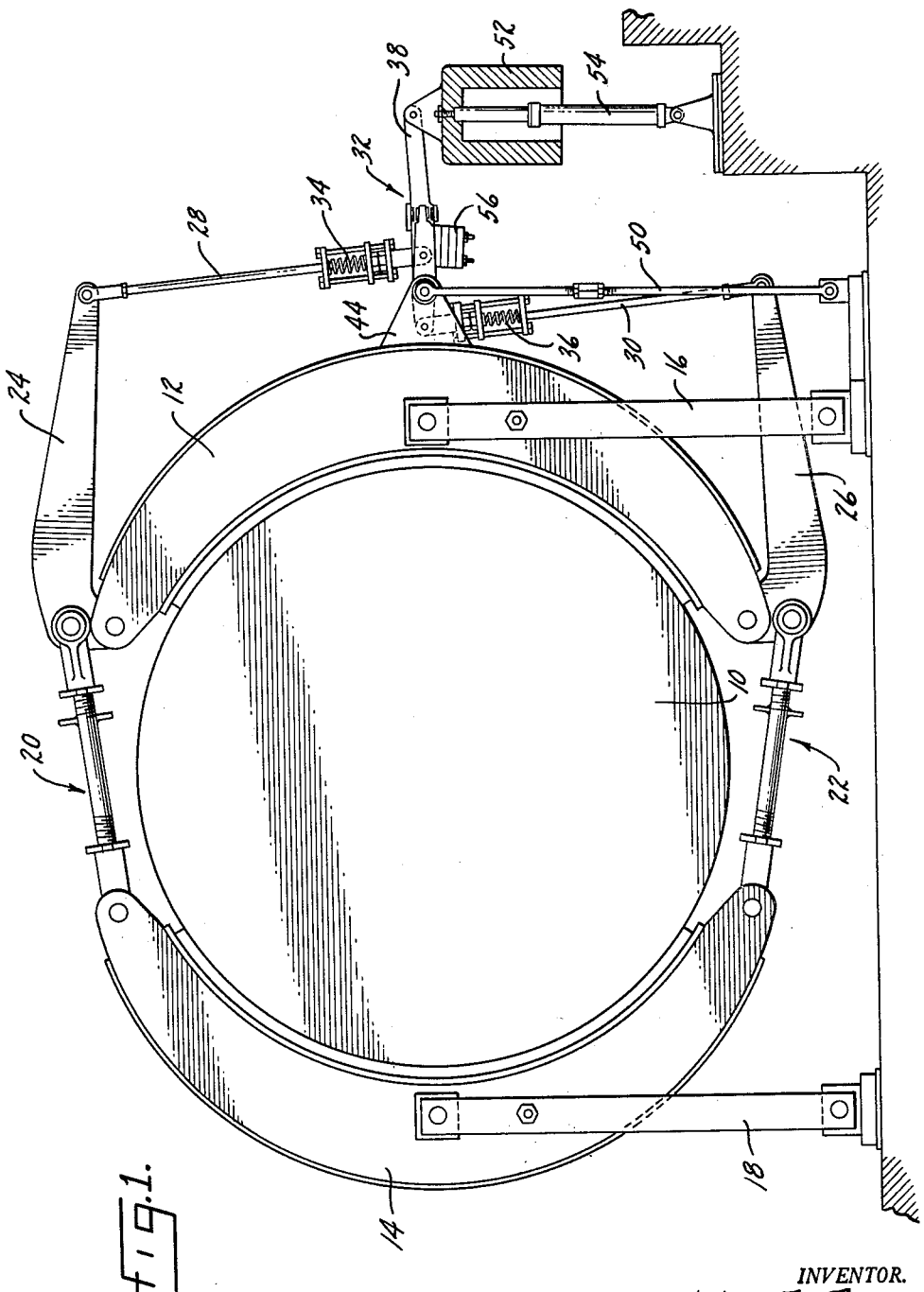

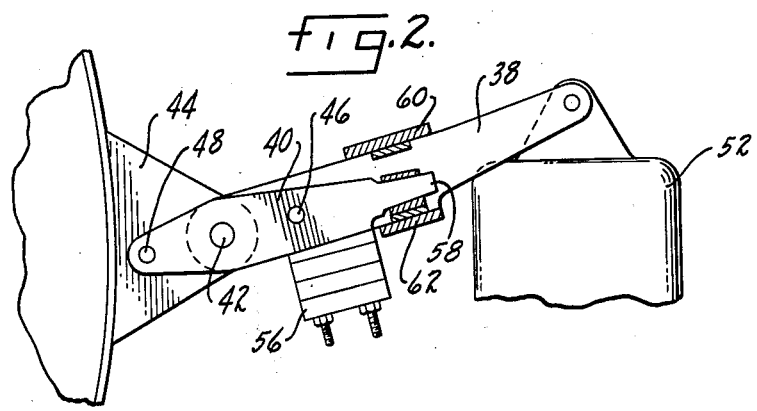
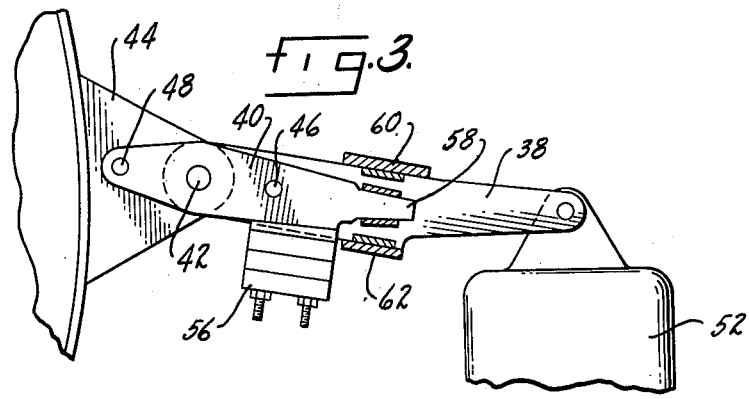
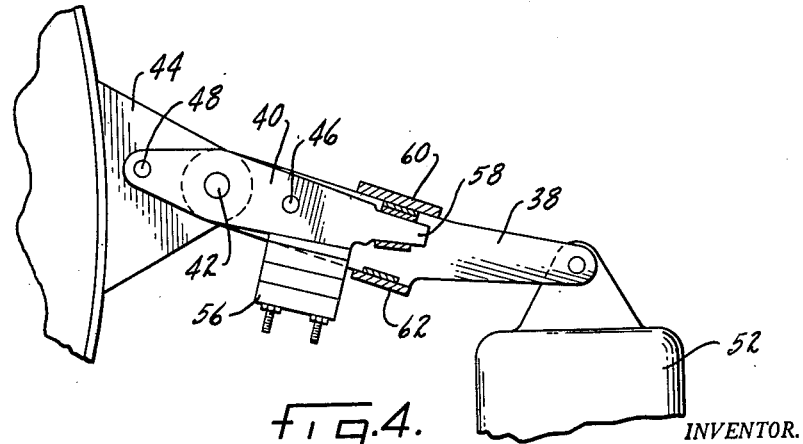

3,155,196
ADJUSTABLE SLACK-FREE BRAKE SYSTEM AND METHOD OF OPERATION THEREOF
John F. Foxx, Wauwatosa, Wis., assignor to Nordberg Manufacturing Company, Milwaukee, Wis., a corporation of Wisconsin
Filed June 6, 1961, Ser. No. 115,201
4 Claims. (Cl. 188—75)

This invention is in the field of braking systems usable, for example, on or with mine hoists, although it is not limited thereto.

A primary object of my invention is a method of operating a braking system which insures prompt and efficient applications of the brakes for all loads.

A further object is to provide a method of operating a braking system whereby a force substantially just sufficient to take up the slack in the brake shoe linkage is continuously applied to the brake shoe linkage so that the brake shoes will be set against the brake drum practically instantaneously with application of a braking force to the brake shoe linkage.

Another object is a braking system which sets up or primes the brake linkage for all loads prior to the brakes being fully applied.

Another object is a brake system of the above type which is so-called gravity primed, or, more accurately, slack adjusted.

Another object is a brake system of the above type in which the slack take up force can be adjusted from zero to a desired percentage of the full braking force.

Other objects will appear from time to time in the ensuing specification and drawings in which:

FIGURE 1 is a side view of a brake drum with my invention;

FIGURE 2 is an enlarged portion of FIGURE 1 in one operating position;

FIGURE 3 is like FIGURE 2 of a different operating position; and

FIGURE 4 is like FIGURES 2 and 3 of a third operating position.

In FIGURE 1, I indicate a conventional brake drum or the like at 10 having brake shoes 12 and 14 each pivotally mounted on supports 16 and 18 and interconnected by a parallel motion post type linkage 20 and 22 at top and bottom. Lever arms 24 and 26 at the top and bottom of the linkage are connected by rods 28 and 30 to a brake lever mechanism 32 to be explained in detail hereinafter. It will be noted that each rod is connected to the brake lever mechanism through springs 34 and 36 to allow for gradual braking, which is conventional.

The brake lever mechanism 32 is shown as made up of two levers, first a so-called brake weight lever 38 and, second, a so-called prime or slack take up lever 40, which have a common pivot 42 on a suitable bracket 44. While these two levers have a common pivot, nevertheless, they are free to move independently of each other, except as explained hereinafter. The operating rods 28 and 30 are pivotally connected to the lever 40 on opposite sides of the pivot 42, the upper rod 28 at 46 and the lower rod at 48. A stabilizing rod 50, mounted on the base in any suitable manner, may also join in the common pivot 42.

To the outer end of the brake weight lever 38, I attach a brake weight 52 which is of sufficient size and weight to apply a full braking force to the brake shoes. As shown in FIGURE 1, a suitable hydraulic cylinder 54 or the like is mounted between the base or foundation and the brake weight such that when the cylinder is energized, the brake weight will be raised. It will be understood that a suitable hydraulic mechanism or the like may be used, although not shown, to energize cylinder 54 so as to raise or release the brake weight to apply or remove the braking force to the drum. In accordance with known operation, when the cylinder is de-energized, the brake weight moves down by gravity and applies a constant predetermined braking force to the brake shoes.

Slack take-up lever 40 has a slack take-up weight 56 connected to it at a suitable point and it should be noted that the weight is of a type that may be varied and, in reality, is made up of a number of individual weights so that more or less may be added to vary the total amount of the weight. In this regard, the weight is preferably adjusted so that it will apply just sufficient braking force through the levers and linkage such that all of the looseness or backlash in the levers and linkage will be removed without applying a braking force, and this is the preferred mode of operation. In addition, the weight may apply a small braking force through a range which is a small, desired percentage of the full braking force, but in any event the magnitude of force applied may be aptly described as just substantially the amount needed to take up the slack in the brake shoe linkage. For example, the weight may be set to apply a braking force of 5% or 10% of the total braking effort. Only such a very small percentage of the total braking effort is used because of power consumption and maintenance considerations. The outer end 58 of the lever 40 is disposed between ears or flanges 60 and 62 on the brake weight lever, suitable bearing or lining material being provided between the contacting portions, if desired.

The use, operation and function of my invention are as follows:

I provide a braking system usable on a mine hoist drum or the like which insures accurate and fast acting operating of the brake. I use a slack take-up weight arrangement to apply just sufficient force to the brake levers and linkage operating the brake shoes for all loads so that all looseness or backlash will be removed from the operating mechanism. The weight may also apply a small percentage of the full braking force, but in any event the small braking force applied during run conditions may be aptly described as substantially just sufficient to remove all looseness or backlash from the operating mechanism. This can be best understood from consideration of FIGURES 2, 3 and 4 which show three positions of the mechanism, FIGURE 2 being the brake-off position, FIGURE 3 the slack take-up position and FIGURE 4 being the brake-set position.

In the FIGURE 2 brake-off position, the hydraulic cylinder 54 has been energized to raise the brake weight 52. This raises lever 38 until the lower flange or ear 62 contacts the outer end 58 of the slack take-up lever, thereby rotating it in a direction to separate rods 28 and 30, thereby separating the brake shoes from the drum. In this position, the brake will be fully off and the drum will be free.

In the FIGURE 3 slack take-up position, the hydraulic cylinder 54 has been de-energized sufficiently such that the brake weight has been lowered or brought down to an intermediate position, but it is not fully released. In this position, both the upper and lower flanges or ears 60 and 62 on the brake lever are not in contact with the outer end 58 of the lever 40. Thus, the lever is free to move on its own, and the weight 56 will rotate the lever clockwise by gravity, moving the rods 28 and 30 inwardly or toward each other, tending to apply a braking force to the drum. The slack take-up weight may be adjusted or calibrated to a precise amount such that it will be sufficient to remove all looseness or backlash from the linkage and mechanism and also possibly apply a small braking force to the drum.

In the FIGURE 4 brake-set position, the hydraulic cylinder 54 has been completely de-energized so that the brake weight 52 is free, thereby applying its full brake force to the brake weight lever 38. It will be noted that the upper ear or flange 60 now contacts the outer end of the lever and rotates it clockwise, thereby drawing the rods 28 and 30 toward each other. In effect, the brake weight 52 is now fully applied to the brake linkage, thereby bringing the brake shoes against the brake drum with full brake force.

This has the advantage that when the skip or mine elevator is to be brought to a stop, the control for the hydraulic cylinder can be brought into immediate position lowering the brake weight to the FIGURE 3 position and the slack take-up weight will also "set-up" the brake mechanism. The weight removes all looseness or backlash from the linkage and, as well, may apply a small braking force. In any event the result is that when the full braking force is thereafter applied, the brake shoes are already in contact with the drum, due to the removal of slack, so they merely tighten up. Contact has already been established. The result is that the full braking force will act immediately and there will be no delay due to lost motion in the linkage.

It should be borne in mind that slack elimination is used for all loads. This means that regardless of whether the skip, cage or mine elevator, as the case may be, is only partially loaded or fully loaded, slack is eliminated prior to the full braking force when the load is to be brought to a stop. Thus I acquire quite accurate control under all load conditions.

While I have shown and described the preferred form of my invention, it should be understood that suitable additional modifications, changes, substitutions and alterations may be made without departing from the essential theme of my invention. I have shown double levers with a floating connection between them to obtain the slack elimination action referred to above. But it should be understood that this is merely a preferred or selected mechanical embodiment which will do the job, whereas other mechanical elements may be used to give the same end result. It is, therefore, wished that the invention be unrestricted, except as by the appended claims.

I claim:
1. A brake system for mine hoists and the like, a brake drum, brake shoes mounted to engage the drum, a linkage constructed to operate the brake shoes, including a brake lever mechanism movable between a brake-off position, a brake-prime position, and a brake-set position,
   said brake lever mechanism including a slack take up lever and a brake weight lever having a common pivot, the linkage being connected to the slake take-up lever, the slack take-up weight being mounted on the slack take-up lever and the brake weight on the brake weight lever, and a lost motion connection between the two levers,
   a brake weight connected to the brake lever mechanism to apply a predetermined braking force to the drum, a slack take-up weight connected to the brake lever mechanism having a weight such that when it acts alone at least all looseness and backlash will be removed from the linkage without an appreciable braking force, power means for operating the brake lever mechanism, and a connection between the brake weight and the brake lever mechanism such that when the brake lever mechanism is in the brake-off position, neither the slack take-up weight nor the brake weight will be effective on the linkage, when in the brake-prime position the brake weight will not be effective but the slack take-up weight will, and when in the brake-set position, both the brake weight and slack take-up weight will be effective.

2. A no-slack brake system, said no-slack brake system including, in combination,
   brake shoe means mounted to engage a brake drum,
   brake shoe actuating linkage connected to the brake shoe means,
   brake applying means operable to exert a braking force to the brake drum through the brake shoe actuating linkage, and
   means for eliminating slack in the brake shoe actuating linkage for periods of indefinite duration prior to and subsequent to application of the brake applying means, said slack eliminating means including
   slack take-up weight means and
   slack take-up weight means linkage operatively connecting the slack take-up means to the brake shoe independently of the brake shoe linkage and floatably disposed with respect thereto for time periods of indefinite duration prior to and subsequent to application of a brake applying force to the brake drum substantially just sufficient to take-up the brake shoe linkage slack and without exerting any appreciable braking effect on the brake shoe linkage.

3. A method of operating a brake system having brake shoes mounted for engagement with a brake drum, and brake linkage controlling operation of the brake shoes, said brake linkage including brake applying means, said method including the steps of
   floatably suspending a weighted slack take-up linkage from the brake linkage independently of the brake applying means,
   applying a slack take-up force to the slack take-up linkage substantially just sufficient to remove all slack in the brake linkage for selectable periods of indefinite time duration prior and subsequent to application of full braking force to the brake shoes, and
   applying braking force to the brake shoe when the brake drum is to be stopped.

4. A method of operating a brake system having brake shoes mounted for engagement with a brake drum means, brake linkage controlling operation of the brake shoes, and brake linkage slack take-up means operatively associated with the brake linkage, said method including the steps of
   applying a slack take-up force to the brake shoe linkage of a magnitude substantially just sufficient to remove all slack in the brake shoe linkage during run conditions of the brake drum means for a period of indefinite time duration prior to the application of a braking force to the brake drum means,
   applying a braking force to the brake drum means when the brake drum means is to be stopped and, thereafter, releasing the braking force from the brake drum means and,
   subsequent to the application of the brake applying force establishing a substantially slack free non-braked condition in the brake system by applying a slack take-up force to the brake shoe linkage of a magnitude substantially just sufficient to remove all slack in the brake shoe linkage during run condition for a period of time whose duration is terminated by the subsequent application of a braking force to the brake drum means.

References Cited in the file of this patent

UNITED STATES PATENTS

| 678,352 | See | July 9, 1901 |
| 1,591,621 | Haight | July 6, 1926 |
| 1,733,898 | Moore | Oct. 29, 1929 |
| 3,058,547 | Tiley et al. | Oct. 16, 1962 |
| 3,068,966 | Knapmeyer | Dec. 18, 1962 |

FOREIGN PATENTS

| 376,379 | Germany | May 28, 1923 |

OTHER REFERENCES

Klapdohr: German application, Serial No. D19,411, printed July 12, 1956, KL 5a 1230, 3 pages spec., 1 sht. drwgs.